(12) United States Patent
Teraoka

(10) Patent No.: US 6,895,007 B1
(45) Date of Patent: May 17, 2005

(54) DATA TRANSMISSION METHOD

(75) Inventor: Fumio Teraoka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/623,012

(22) PCT Filed: Jul. 5, 1999

(86) PCT No.: PCT/JP99/03627
§ 371 (c)(1),
(2), (4) Date: Sep. 28, 2000

(87) PCT Pub. No.: WO00/41363
PCT Pub. Date: Jul. 13, 2000

(30) Foreign Application Priority Data

Jan. 8, 1999 (JP) .......................................... 11-003411

(51) Int. Cl.[7] .......................... H04L 12/28; H04L 12/56
(52) U.S. Cl. ...................... 370/392; 370/352; 370/389; 370/401
(58) Field of Search ................................ 370/352, 354, 370/356, 466, 469, 471, 389, 392, 401, 402, 403, 338, 331

(56) References Cited

U.S. PATENT DOCUMENTS 5,841,769 A * 11/1998 Okanoue et al. ............ 370/338
6,172,986 B1 * 1/2001 Watanuki et al. ........... 370/466
6,501,767 B1 * 12/2002 Inoue et al. ................ 370/465
6,614,774 B1 * 9/2003 Wang ......................... 370/338
6,625,145 B1 * 9/2003 Winell ........................ 370/389

FOREIGN PATENT DOCUMENTS

| JP | 9-282259 | 10/1997 | ........... G06F/13/00 |
| JP | 11-68842 | 3/1999 | ........... H04L/12/56 |

OTHER PUBLICATIONS

Kazuhiro Shitama, Fumio Teraoka, "Providing Host Migration Transparency in IPv6", Jouhou Shori Gakkai Kenkyuu Houkoku, vol. 98, No. 53, Mobile Computing 5–5, p. 27–34, (May 28, 1998).

* cited by examiner

Primary Examiner—Afsar Qureshi
(74) Attorney, Agent, or Firm—Bell, Boyd & Lloyd LLC

(57) ABSTRACT

In the data transmitting method according to this invention, the application layer reads a resolver to acquire a node identifier and then makes an inquiry to the DNS server when a user designates the hose name of the destination. Upon acquiring the node identifier, the application layer transmits the node identifier to the VIP layer through the TCP/UDP layer. The VIP layer makes an inquiry to the DNS server to acquire the home prefix of the destination node in accordance with the node identifier. After acquiring the node identifier and the home prefix, the VIP layer combines them together, generating a mobile-oriented IPv6 address. Mobile permeability can thereby realized, without increasing the header size of packets, in the data transmitting method according to the present invention.

2 Claims, 5 Drawing Sheets

DATA TRANSMISSION METHOD

TECHNICAL FIELD

The present invention relates to a data transmitting method, and more particularly to a method in which data can be reliably transmitted even if nodes move in a network system.

BACKGROUND ART

In recent years, compact, high-performance and portable computers, generally called "personal computers," have come into use in increasing numbers. Now the users can take the personal computers (PCs) everywhere. The user cannot only take the PC everywhere, but also connect the PC to the sub-net at the place where the PC has been brought to and thereby receive various network services. Thus, so-called "mobile computing environment" is now coining into existence.

In the mobile computing environment, the nodes connected to a network are supposed to move. The communication between the nodes must therefore be continuously achieved no matter how and where the nodes are moving. This characteristic of the environment is called "mobile permeability."

At present it is proposed that mobile permeability be realized on the basis of the specification of IPv6 (Internet Protocol version 6) addresses. There are two protocols for achieving the mobile permeability. They are Mobile IPv6 and VIPonV6.

The use of these two protocols can realize the mobile permeability based on IPv6. It is necessary, however, to use identifiers that are invariable to the moving of the nodes. If such identifiers are used, the packet headers will have a very large size.

Mobile IPv6 or VIPonV6 may be applied in a wireless environment of an extremely narrow band. In this case, the packet headers will inevitably become large in size. This would be particularly a great problem.

All 128 bits of each IPv6 address may be used as a node identifier. If this is the case, the information about the position of the node will be lost completely. Consequently, it will become substantially impossible to control the paths between the sub-nets.

DISCLOSURE OF THE INVENTION

In consideration of the above, the present invention has been made. Its object is to provide a data transmitting method that can easily realize mobile permeability, without increasing the header size of the packets.

To attain this object, the invention is characterized in several respects. First, a node identifier of each node and a home prefix indicating a sub-net to which the node is usually connected are stored in connection with a host name of the node. Then, a node identifier corresponding to a host name of the second node input and the home prefix of the second node are read out. Further, an IP address is generated, which has the node identifier and home prefix that have been read. Next, a data packet having this IP address is generated. The data packet is transmitted to the router of the sub-net to which the second node is usually connected, in accordance with the IP address. A header indicating a location, to which the second node has moved, is added to the data packet transmitted to the router, on the basis of cache information held by the router to manage the second node. Finally, the data packet is transmitted to the second node on the basis of the header added to the data packet.

BEST MODE FOR CARRYING OUT THE INVENTION

Figure 1:
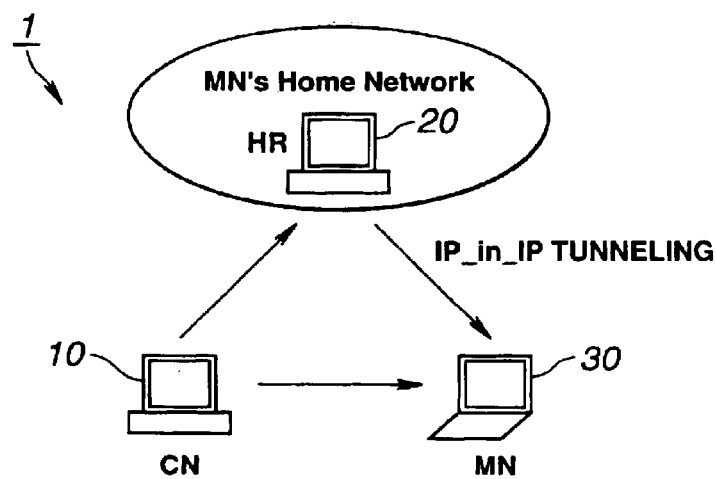
FIG. 1 is a schematic representation of a network system to which this invention is applied.

Embodiments of this invention will be described below, with reference to the accompanying drawings. The invention is applied to, for example, a network system 1 illustrated in FIG. 1.

Figure 2:
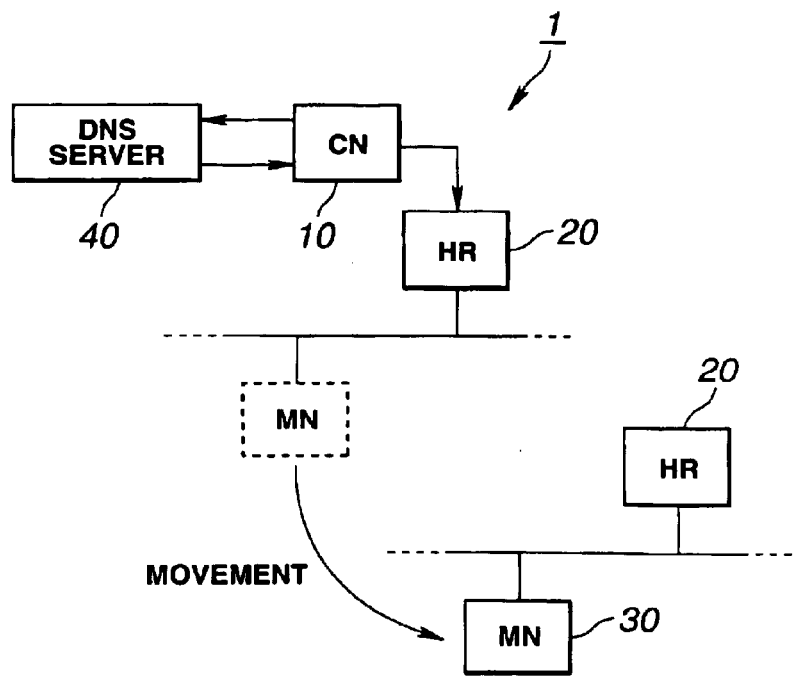
FIG. 2 is a diagram showing the network system provided with a DNS server.

The network system 1 enables a node (CN) 10 to transmit data packets to a mobile node (MN) 30. As shown in FIG. 2, the network system 1 further comprises a DNS server 40 that is designed to read the mobile-oriented Ipv6 (Internet Protocol version 6) addresses that corresponds to the host names of various mobile nodes 30.

Figure 3:
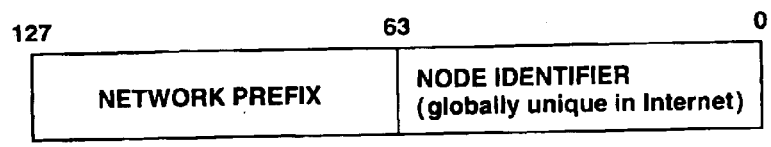
FIG. 3 is a diagram illustrating a mobile-oriented IPv6 address.

As shown in FIG. 3, a mobile-oriented IPv6 address consists of 128 bits. It is composed of a node identifier (lower 64 bits) and a network prefix (upper 64 bits). The node identifier identifies a particular one node. The network prefix indicates the position of the sub-net to which the node is connected.

The node identifier identifies nothing but the node. That is, it is used to identify or authenticate the node, no matter how the node is moving and where it is located. The network prefix is used to transmit packets to the node connected to the sub-net.

The upper 64 bits perform, after all, the same function as the upper 64 bits of the existing specification defined by IETF. Therefore, the path control system now available for the IP layer can be utilized without being modified at all.

The network architecture that achieves mobile permeability and verifies a mobile node in accordance with a mobile-oriented IPv6 address is called "v6VIP." The v6VIP works on the basis of two principles. First, the mobile-oriented IPv6 address is used as IPv6 address. Secondly, VIP function is utilized to provide mobile permeability and to authenticate mobile nodes.

Figure 4:
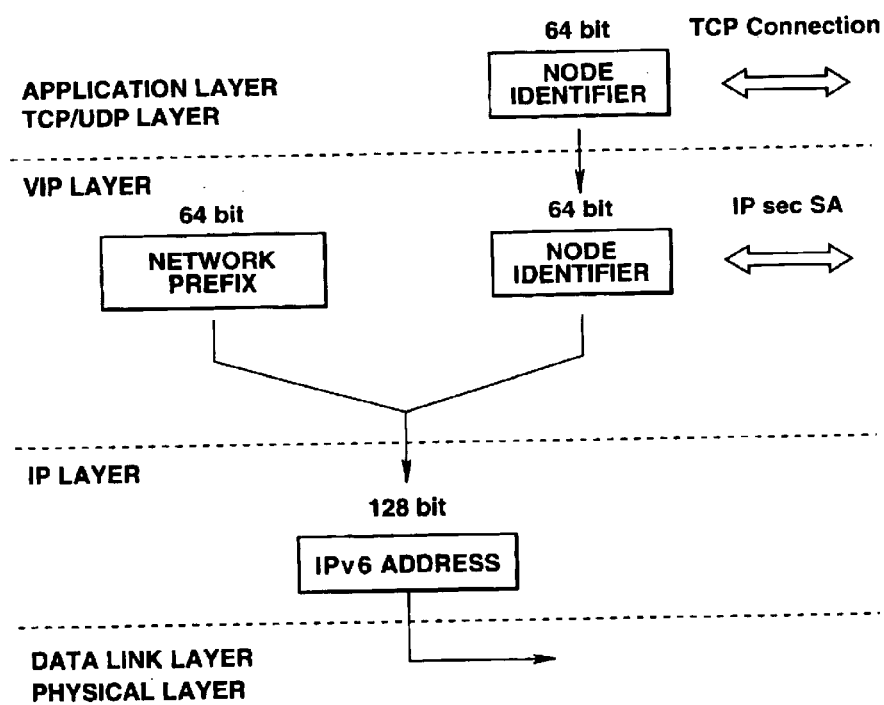
FIG. 4 is a diagram depicting the protocol hierarchy employed in v6VIP.

FIG. 4 shows the protocol hierarchy employed in v6VIP. The protocol hierarchy comprises an application layer, a TCP/UDP layer, a VIP layer, an IP layer, a data link layer, and a physical layer.

In the layer above the TCP/UDP layer, node identifiers, each consisting of the upper 64 bits of the mobile-oriented IPv6 address, are used to identify nodes. In the VIP layer located between the TCP/UDP layer and the IP layer, the node identifier is combined with the 64-bit network prefix corresponding to the node identifier, thereby generating a 128-bit mobile-oriented IPv6 address. The correlation between the node identifier and the network prefix is managed in accordance with prescribed cache information (hereinafter referred to as "AMT (Address Mapping Table) entry."

On the basis of the mobile-oriented IPv6 address thus generated, the IP layer transmits a data packet. To receive a packet, the network prefix is removed from the mobile-oriented IPv6 address in the IP layer and only the node identifier is transferred to the upper layer.

No AMT entry for the destination node may exist in the VIP layer. That is, the network prefix corresponding to the node identifying the destination node may be unknown. If so, the network prefix to the home network of the destination node is combined with the node identifier of the destination node, thus generating a mobile-oriented IPv6 address. The home network of the node is the sub-net to which the node is usually connected. How to acquire the network prefix of the home network (hereinafter referred to as "home prefix") will be described later in detail.

The node 10 is a node from which data will be transmitted. The node 10 will generate a mobile-oriented IPv6 address and transmit a data packet if it holds the AMT entry relating to the mobile node 30. If the node 10 holds no AMT entries, it will read the node identifier or the like from the DNS server 40, will generates a mobile-oriented IPv6 address, and will transmit a data packet.

The network system 1 comprises a home router 20, which is connected to the sub-net of the mobile node 30. The home router 20 always holds the latest AMT entry relating to the mobile node 30 managed.

In the network system 1 so constituted as described above, data packets are transmitted from the node 10 to the mobile node 30 as will be described below.

As long as the node 10 holds the AMT entry relating to the mobile node 30, it identifies the sub-net to which the mobile node 30 is connected at present. The node 10 therefore combines the node identifier of the mobile node 30 with the network prefix of the sub-net to which the mobile node 30 is connected, thereby generating a mobile-oriented IPv6 address.

Figure 5:
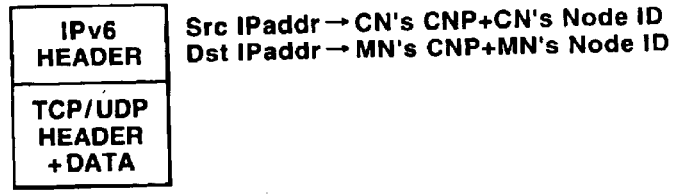
FIG. 5 is a diagram showing the configuration of a data packet.

As a result, a data packet is generated, which is made up of, as shown in FIG. 5, an IPv6 header having the mobile-oriented IPv6 address, a TCP/UDP header, and data. The IPv6 header is composed of the current network prefix (CNP) of the node 10 (CN's CNP), the node identifier of the node 10 (CN's Node ID), the current network prefix of the mobile node 30 (MN's CNP), and the node identifier of the mobile node 30 (MN's Node ID).

The IP layer controls the path in accordance with the mobile-oriented lPv6 address. As the path is controlled, the data packet is transmitted to the mobile node 30.

It will be explained how the system operates when the mobile node 30 moves from the home sub-net and is connected to another sub-net.

When the mobile node 30 moves to the other sub-net, it receives a router advertisement on the sub-net it is now connected to. The mobile node 30 combines the network prefix contained in the router advertisement, with the node identifier of its own mobile identifier, generating a mobile-oriented IPv6 address. If the mobile-oriented IPv6 address is used, the setting of state-full of DHCPv6 or the like is not particularly required. The mobile node 30 can acquire an IP address at the sub-net to which it has moved.

After acquiring a new mobile-oriented IPv6 address at the sub-net it has reached, the mobile node 30 transmits a message to the home router 20 and the node 10 with which it is communicating, thus informing that it has moved to the other sub net. This message is called "AMT-update message."

The node 10 needs to call a resolver if no AMT entries relating to the destination node exists in the VIP layer because the mobile node 30 has moved to the other sub-net. The node 10 calls the revolver in order to call the DNS server 40, thereby to acknowledge the home prefix of that node. The resolver is a library that makes inquiries to the DNS server 40. In UNIX (trademark), for example, the resolver is linked to the application program, usually at the time of compiling the application program. The following two methods are available for calling the resolver.

Figure 6:
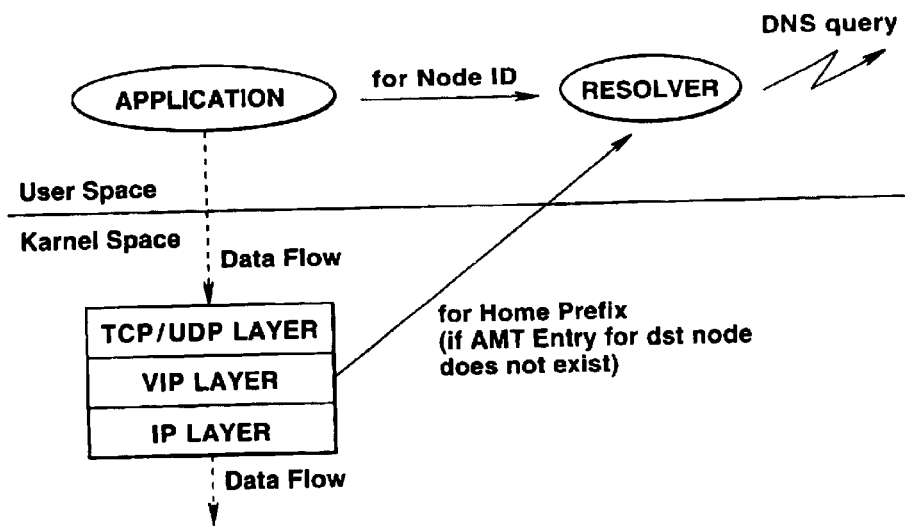
FIG. 6 is a diagram showing a system for acquiring node identifiers and home prefixes in a network.
Figure 7:
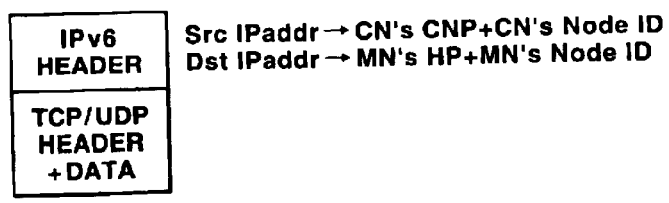
FIG. 7 is a diagram showing the configuration of a data packet.

The first method is to call the resolver by using the network configuration. For instance, as is shown in FIG. 6, the application layer calls the resolver which has acquired the node identifier, when a user designates the host name of the destination. The application layer then makes an inquiry to the DNS server 40. When the application layer acquires the node identifier from the DNS server 40, it transmits the node identifier to the VIP layer through the TCP/UDP layer. The VIP layer calls the resolver and makes an inquiry to the DNS server 40, thereby to acquire the home prefix of the destination node in accordance with the node identifier. After acquiring both the node identifier and the home prefix, the VIP layer combines them, generating a mobile-oriented IPv6 address. As a result, a data packet consisting of an IPv6 header, a TCP/UDP header and data is generated, as is illustrated in FIG. 7.

The IPv6 header is composed of the current network prefix of the node 10 (CN's CNP), the node identifier of the node 10 (CN's Node ID), the home prefix of the mobile node 30 (MN's HP) and the node identifier of the mobile node 30 (MN's Node ID). The IP layer controls the path in accordance with the mobile-oriented IPv6 address. Hence, the data packet is transmitted via the path, thus controlled, to the home router 20 to which the mobile node 30 is usually connected.

Figure 8:
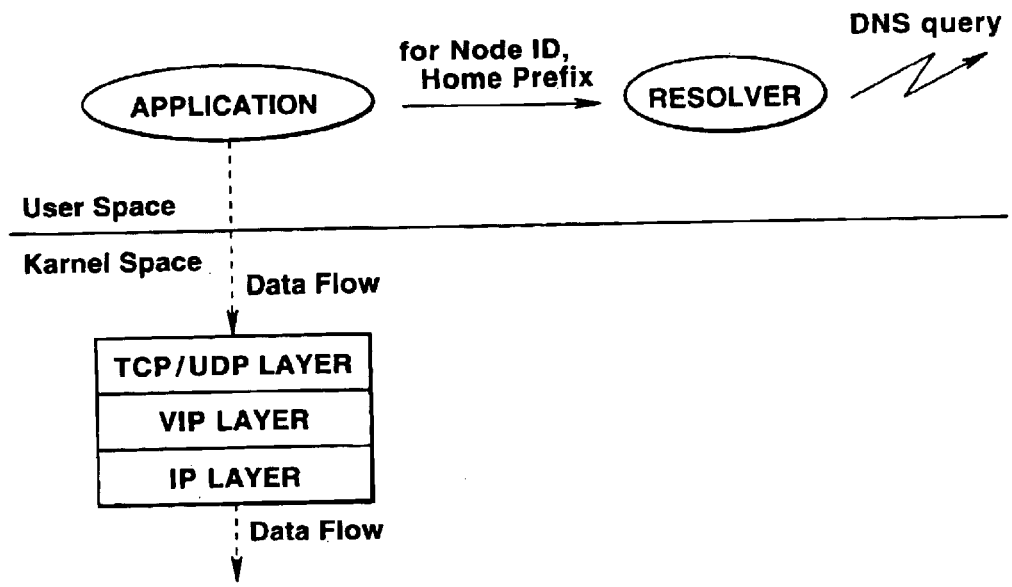
FIG. 8 is a diagram illustrating a system for acquiring node identifiers and home prefixes by the use of an application program.

The second method is to call the resolver by using the application program. For example, as shown in FIG. 8, the application layer may call the resolver when the user designates the host name of the destination. The application layer then makes an inquiry to the DNS server 40, thereby acquiring both the node identifier and the home prefix at a time. The node identifier and the home prefix, thus acquired, are transmitted via the TCP/UDP layer to the VIP layer. The VIP layer combines the node identifier and the home prefix, generating a mobile-oriented IPv6 address. A data packet of the type shown in FIG. 7 is then generated. The data packet is transmitted, via the path controlled by the IP layer, to the home router 20 to which the mobile node 30 is usually connected.

Thanks to the DNS server 40 provided in the network system 1, the node 10 need not store a node identifier, which consists of 64 bits. In addition, the home prefix of the node 10 can easily acquire its home prefix even if the node 10 holds no AMT entries relating to the mobile node 30.

As described above, the node 10 may hold no AMT entries relating to the mobile node 30, unable to determine to which sub-net the mobile node 30 is connected at present. In this case, the VIP layer combines the home prefix and node identifier of the mobile node 30, generating an IP address. The data packet is transmitted to the home router 20 of the mobile node 30.

Figure 9:
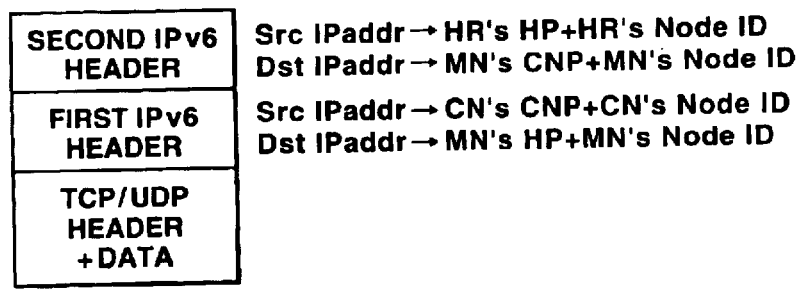
FIG. 9 is a diagram showing the configuration of a data packet.

The home router 20 holds the AMT entry relating to the mobile node 30 by all means. Upon receipt of the data packet, the home router 20 adds a new IPv6 header to the data packet as is illustrated in FIG. 9. The new IPv6 header contains a destination address that is the IP address of the sub-net to which sub-net the mobile node 30 has moved. The data packet, which has the new IPv6 header, is transferred to the mobile node 30. This transfer method is called "IP-in-IP tunneling."

The data packet, subjected to the IP-in-IP tunneling, is the combination of the data packet shown in FIG. 7 and the second IPv6 header. More precisely, this data packet is composed of the first IPv6 header, the second IPv6 header, the TCP/UDP header, and the data. The second IPv6 packet consists of the home prefix of the home router 20 (HR's HP), the node identifier of the home router 20 (HR's Node ID), the current network prefix of the mobile node 30 (MN's CN), and the node identifier of the mobile node 30 (MN's Node ID).

Thus, the data packet can be transmitted to the mobile node 30 on the basis of the second IPv6 header, even if the mobile node 30 moves from the initial sub-net to another sub-net. Further, if the packet thus received is transferred the destination node after the end-address field of the packet has been rewritten, the tunneling can prevent the data packet from being regarded as a false-address packet and then discarded as such in the router.

The mobile node 30 may receive the data packet transferred through the home router 20 by means of IP-in-IP tunneling. If this is the case, the mobile node 30 determines that the node 10, i.e., the source of the data packet, holds no AMT entries relating to the mobile node 30. The mobile node 30 then transmits an AMT-update message to the node 10, informing the node 10 of its current node identifier and current network prefix.

The AMT-update message must contain, by all means, an authentication header, which is an extension header. Otherwise, an unauthenticated ATM entry would be generated in the home router or in the destination node.

Upon receipt of the ATM-update message from the mobile node 30, the node 110 communicating with the mobile node 30 acknowledges the data it has received, by referring to the authentication header contained in this message. The node 10 then extracts the mobile-oriented IPv6 address from the payload of the message and registers the address in the AMT it holds. Since a survival time is set in the ATM entry, the ATM entry will be deleted upon lapse of that survival time.

The protocol hierarchy mentioned above will be described in detail.

In a best possible model, the VIP layer should be inserted between the IPv6 layer and the TCP/UDP layer, and the v6VIP function is added to the VIP layer. To facilitate the mounting of components, however, the v6VIP function is added directly to the IPv6 layer in the present embodiment.

Figure 10:
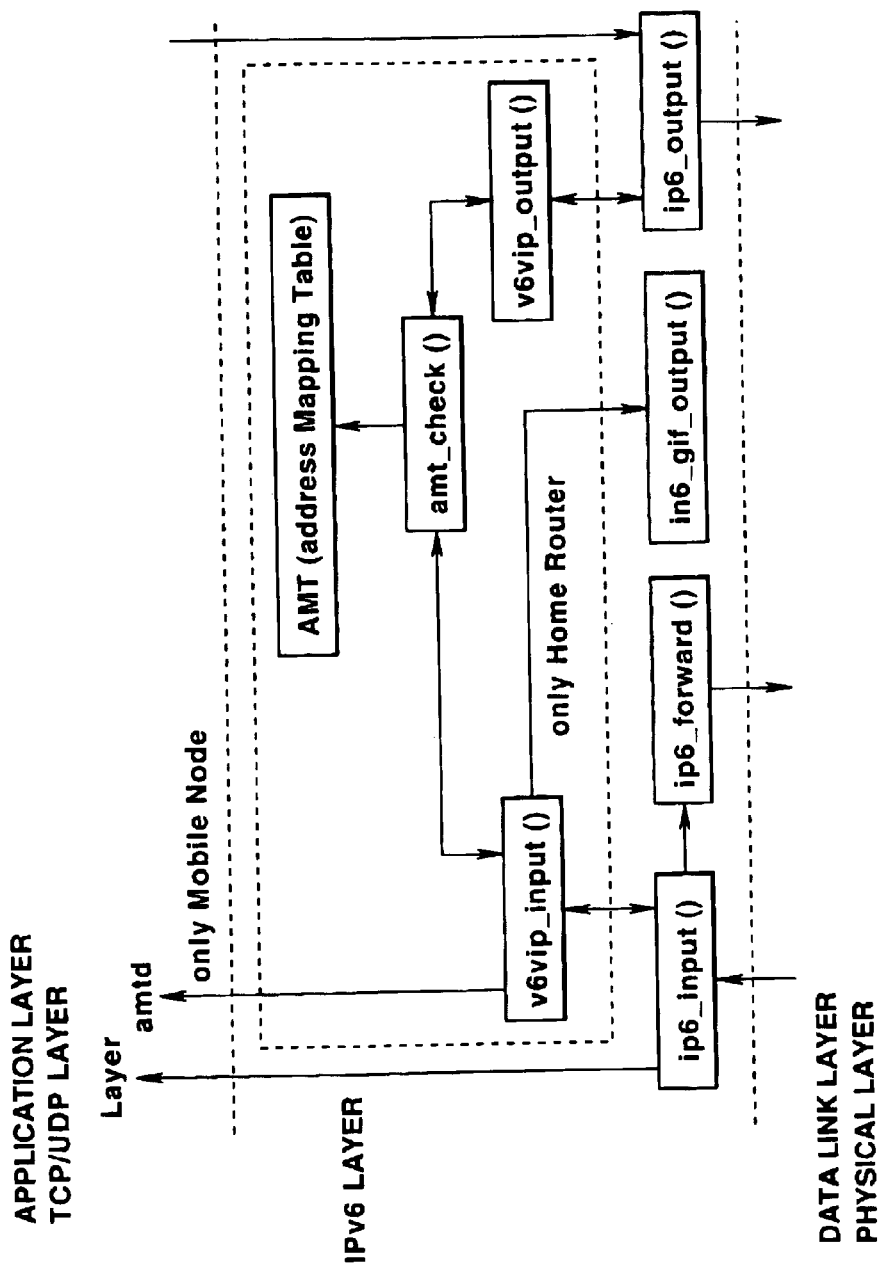
FIG. 10 is a block diagram of an IPv6 layer added with a v6VIP function.

FIG. 10 is a block diagram of the IPv6 layer added with the v5VIP function. The various functions added to the IPv6 layer will be described below.

Operation of function v6vip_output ( )

First, it is checked whether an AMT entry exists in the node identifier of the destination node, which consists of the lower 64 bits of the destination address of the packet to be transmitted. If an AMT entry exists there, the upper 64 bits of the destination address are replaced with the network prefix described in the ATM entry, and the operation returns to ip6_output ( ).

If an AMT entry does not exist there, the home prefix itself of the destination node stored in the upper 64 bits of the destination address is utilized, and the operation returns to ip6_output ( ).

Operation of function v6vip_input ( )

This function operates in one way for the node that works as a home router and in another way for the mobile node that does not work as such.

If the node is one working as a home router, it refers to the AMT, thereby acquiring the mobile-oriented IPv6 address of the destination, if the node identifier of the mobile node managed by the home router is contained in the lower 64 bits of the destination address of the packet the node has received. The node then transmits the packet to the mobile node by means of IP-in-IP tunneling. In the process of IP-in-IP tunneling, a GIF (Generic InterFace) employed in hydrangea is used, thereby transferring the operation to in6_gif_output ( ), which is the output function of the GIF.

If the node is a mobile node, it requests that the AMT demon amtd should transmit the AMT-update message to the node that has transmitted the packet, in the case where the packet received has been transferred from the home router by means of IP-in-IP tunneling.

Operation of function amt check ( ).

This function is called from either v6vip_input ( ) or v6vip_output ( ) and determines whether an AMT entry relating to the node identifier designated exists or not. If such an AMT entry exists, the function returns the network prefix corresponding to the node identifier. If such an AMT entry does not exists, it returns.

The function amt check ( ) does only retrieve the AMT entry. The AMT entry is registered or deleted by the AMT demon amtd.

INDUSTRIAL APPLICABILITY

As has been described above in detail, in the data transmitting method according to the present invention, the node identifier of each node and the home prefix indicating the sub-net to which the node is usually connected are stored in connection with the host name of the node. The node identifier corresponding to the host name of the second node, which has been input, and the home prefix of the second node are read out, and data is transmitted from the first node to the second node via the router designated by the home prefix. Mobile permeability is thereby realized easily, without increasing the header size of the packets.

Moreover, the first node need not store a node identifier. Further, the first node can easily acquire the home prefix of the second node and can therefore transmit are no ATM entries relating to the second node.

What is claimed is:

1. A data transmitting method of transmitting data from a first node to a second node through a router, comprising the steps of:

storing a node identifier of each node and a home prefix indicating a sub-net to which the node is usually connected, in connection with a host name of the node;

reading a node identifier corresponding to a host name of the second node input and the home prefix of the second node;

generating an IP address having the node identifier and home prefix which have been read;

generating a data packet having the IP address generated;

transmitting the data packet to the router of the sub-net to which the second node is usually connected, in accordance with the IP address;

adding a header indicating a location to which the second node has moved, to the data packet transmitted to the router, on the basis of cache information held by the router to manage the second node; and transmitting the data packet to the second node on the basis of the header added to the data packet, wherein an application program reads the node identifier corresponding to the host name of the second node input.

2. A data transmitting method according to claim 1, characterized in that the node identifier corresponding to the host name of the second node input and the home prefix of the second node are read by using an application program.

* * * * *